(12) United States Patent
Wu et al.

(10) Patent No.: US 10,102,195 B2
(45) Date of Patent: Oct. 16, 2018

(54) ATTRIBUTE FILL USING TEXT EXTRACTION

(71) Applicant: Amazon Technologies, Inc., Reno, NV (US)

(72) Inventors: Jianhui Wu, Bellevue, WA (US); Taibai Xu, Seattle, WA (US); Wenke Zhang, Seattle, WA (US); Rongzhou Shen, Seattle, WA (US); Krishnamurthy Koduvayur Viswanathan, Seattle, WA (US); Gabriel Parent, Seattle, WA (US); Jiwei Cao, Seattle, WA (US); Debprakash Patnaik, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 139 days.

(21) Appl. No.: 14/314,962

(22) Filed: Jun. 25, 2014

(65) Prior Publication Data
US 2015/0378975 A1 Dec. 31, 2015

(51) Int. Cl.
*G06F 17/20* (2006.01)
*G06F 17/24* (2006.01)
*G06Q 10/10* (2012.01)
*G06Q 30/06* (2012.01)

(52) U.S. Cl.
CPC ........... *G06F 17/243* (2013.01); *G06Q 10/10* (2013.01); *G06Q 30/06* (2013.01)

(58) Field of Classification Search
CPC .... G06F 17/243; G06F 17/2247; G06Q 10/10
See application file for complete search history.

(56) References Cited

U.S. PATENT DOCUMENTS

| | | | |
|---|---|---|---|
| 5,825,867 A * | 10/1998 | Epler | H04M 1/006 379/215.01 |
| 6,246,986 B1 | 6/2001 | Ammicht et al. | |
| 6,574,614 B1 | 6/2003 | Kesel | |
| 6,629,098 B2 | 9/2003 | Mc George et al. | |
| 6,848,002 B1 | 1/2005 | Detlef et al. | |

(Continued)

FOREIGN PATENT DOCUMENTS

| | | |
|---|---|---|
| WO | 2011088053 | 7/2011 |
| WO | 2013180874 | 12/2013 |

OTHER PUBLICATIONS

PCT/US2015/037454, "International Search Report and written opinion", dated Sep. 3, 2016, 8 pages.

(Continued)

*Primary Examiner* — Wilson Tsui
*Assistant Examiner* — Shahid Khan
(74) *Attorney, Agent, or Firm* — Kilpatrick Townsend & Stockton LLP

(57) ABSTRACT

Systems and methods involve filling missing attribute values from unstructured text. A computing device may provide a plurality of items, such as an item catalog for an electronic marketplace. When an item is found to have a missing attribute value, a plurality of existing values for that attribute is compiled by mining other items. Text associated with the item is parsed to determine possible values for the attribute. From those possible values, the most likely value is identified and the missing attribute value is populated with that value.

18 Claims, 7 Drawing Sheets

(56) References Cited

U.S. PATENT DOCUMENTS

| | | | |
|---|---|---|---|
| 6,882,973 B1 * | 4/2005 | Pickering | G10L 15/22 379/88.02 |
| 6,920,463 B2 | 7/2005 | Kishimoto et al. | |
| 6,924,797 B1 * | 8/2005 | MacPhail | G06F 3/0481 715/700 |
| 6,983,323 B2 | 1/2006 | Cantrell et al. | |
| 7,062,440 B2 | 6/2006 | Tucker et al. | |
| 7,069,221 B2 | 6/2006 | Crane et al. | |
| 7,162,421 B1 * | 1/2007 | Zeppenfeld | G10L 15/22 704/233 |
| 7,418,392 B1 | 8/2008 | Mozer et al. | |
| 7,461,033 B1 | 12/2008 | McConnell et al. | |
| 7,477,780 B2 | 1/2009 | Boncyk et al. | |
| 7,483,903 B2 | 1/2009 | Kulkarni et al. | |
| 7,577,649 B2 | 8/2009 | Wu et al. | |
| 7,720,683 B1 | 5/2010 | Vermeulen et al. | |
| 7,774,204 B2 | 8/2010 | Adams et al. | |
| 7,848,314 B2 | 12/2010 | Li et al. | |
| 7,881,974 B1 | 2/2011 | Thirumalai et al. | |
| 7,917,941 B2 | 3/2011 | Wallman et al. | |
| 8,000,971 B2 | 8/2011 | Ljolje | |
| 8,046,221 B2 | 10/2011 | Ljolje et al. | |
| 8,051,040 B2 | 11/2011 | Johnson et al. | |
| 8,146,136 B1 | 3/2012 | Siemens et al. | |
| 8,180,025 B2 * | 5/2012 | Pieraccini | H04M 3/493 340/7.51 |
| 8,374,879 B2 | 2/2013 | Falcon et al. | |
| 8,417,223 B1 * | 4/2013 | Trivi | H04M 3/53366 455/412.1 |
| 8,417,562 B1 | 4/2013 | Siemens et al. | |
| 8,489,603 B1 | 7/2013 | Weissgerber et al. | |
| 8,515,766 B1 | 8/2013 | Bringert et al. | |
| 8,532,269 B2 | 9/2013 | Chambers et al. | |
| 8,660,843 B2 | 2/2014 | Falcon et al. | |
| 8,688,508 B1 | 4/2014 | Singh et al. | |
| 9,026,438 B2 | 5/2015 | Herbig et al. | |
| 9,548,066 B2 | 1/2017 | Jain et al. | |
| 2002/0026440 A1 | 2/2002 | Nair et al. | |
| 2002/0198940 A1 | 12/2002 | Bower et al. | |
| 2003/0171928 A1 | 9/2003 | Falcon et al. | |
| 2003/0171929 A1 | 9/2003 | Falcon et al. | |
| 2004/0103116 A1 | 5/2004 | Venkataraman et al. | |
| 2004/0143516 A1 | 7/2004 | Hastie et al. | |
| 2005/0027527 A1 | 2/2005 | Junkawitsch et al. | |
| 2005/0060324 A1 | 3/2005 | Johnson et al. | |
| 2005/0075946 A1 | 4/2005 | Henning et al. | |
| 2005/0131704 A1 | 6/2005 | Dragosh et al. | |
| 2005/0289168 A1 * | 12/2005 | Green | G06F 17/3064 |
| 2006/0048016 A1 | 3/2006 | Reindler et al. | |
| 2006/0085108 A1 | 4/2006 | Grier et al. | |
| 2006/0122858 A1 | 6/2006 | Miles et al. | |
| 2006/0212930 A1 | 9/2006 | Shull et al. | |
| 2007/0014422 A1 | 1/2007 | Wesemann et al. | |
| 2007/0098351 A1 | 5/2007 | East et al. | |
| 2007/0143115 A1 | 6/2007 | Falcon et al. | |
| 2007/0219863 A1 | 9/2007 | Park et al. | |
| 2007/0297337 A1 | 12/2007 | Beygelzimer et al. | |
| 2008/0082352 A1 | 4/2008 | Schmidtler et al. | |
| 2008/0089530 A1 | 4/2008 | Bostick et al. | |
| 2008/0097835 A1 | 4/2008 | Weiser et al. | |
| 2008/0189187 A1 | 8/2008 | Hao et al. | |
| 2009/0150156 A1 | 6/2009 | Kennewick et al. | |
| 2009/0171960 A1 * | 7/2009 | Katzir | H04L 63/30 |
| 2010/0217604 A1 | 8/2010 | Baldwin et al. | |
| 2011/0093467 A1 * | 4/2011 | Sharp | G06F 17/2264 707/741 |
| 2011/0289026 A1 * | 11/2011 | Kannan | G06F 17/30997 706/12 |
| 2012/0223885 A1 | 9/2012 | Perez et al. | |
| 2012/0245935 A1 * | 9/2012 | Wong | H04W 4/12 704/235 |
| 2012/0253790 A1 | 10/2012 | Heck et al. | |
| 2013/0218574 A1 | 8/2013 | Falcon et al. | |
| 2013/0288655 A1 * | 10/2013 | Forountanpour | H04M 1/6008 455/418 |
| 2013/0316679 A1 | 11/2013 | Miller et al. | |
| 2014/0018050 A1 * | 1/2014 | Isidore | H04M 1/72519 455/414.1 |
| 2014/0052438 A1 | 2/2014 | Yerrace et al. | |
| 2014/0222422 A1 | 8/2014 | Sarikaya et al. | |
| 2014/0365209 A1 | 12/2014 | Evermann | |
| 2015/0142447 A1 | 5/2015 | Kennewick et al. | |
| 2015/0170665 A1 | 6/2015 | Gundeti et al. | |
| 2016/0042748 A1 | 2/2016 | Jain et al. | |

OTHER PUBLICATIONS

U.S. Appl. No. 13/360,938, U.S. Patent Application, filed Jan. 30, 2012, Titled: System and Method for Evaluating Correction Submissions With Supporting Evidence.

U.S. Appl. No. 14/107,931, U.S. Patent Application, filed Dec. 16, 2013, Titled: Attribute-Based Audio Channel Arbitration.

U.S. Appl. No. 14/456,620, U.S. Patent Application, filed Aug. 11, 2014, Titled: Voice Application Architecture.

U.S. Appl. No. 15/253,214, U.S. Patent Application, filed Aug. 31, 2016, Titled: Artificial Intelligence Feature Extraction Service for Products.

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

ATTRIBUTE FILL USING TEXT EXTRACTION

BACKGROUND

Year after year, electronic business transactions are growing in popularity. Because of this, it has become increasingly important for e-commerce companies, such as Internet retailers, to distinguish themselves by providing greater customer satisfaction while attracting a multitude of vendors. These retailers compete for both merchants and customers, and thus may wish to provide as much item information as possible for customers while simultaneously reducing the workload for merchants.

BRIEF DESCRIPTION OF THE DRAWINGS

Various embodiments in accordance with the present disclosure will be described with reference to the drawings, in which.

DETAILED DESCRIPTION

Figure 1:
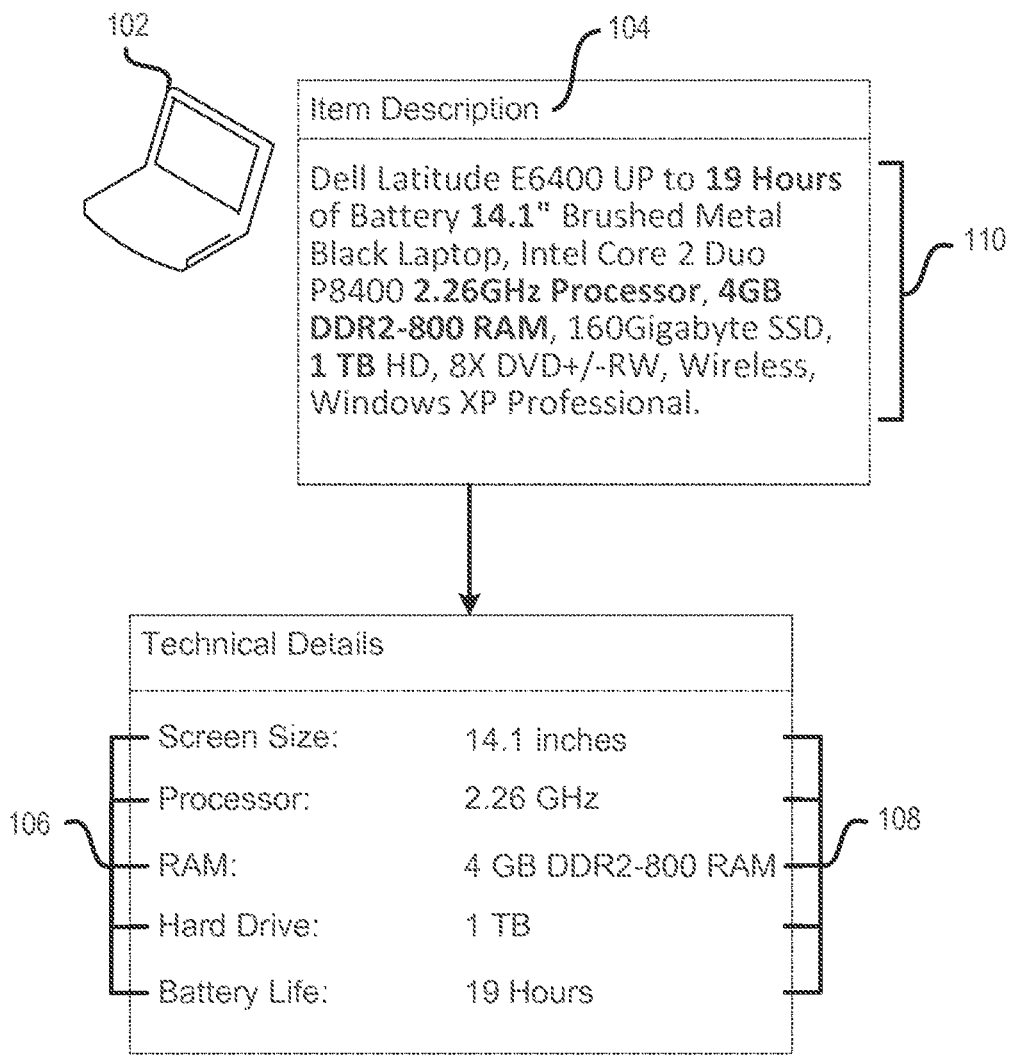
FIG. 1 illustrates an example embodiment of the current disclosure.

Techniques described herein include an automatic and scalable approach for discovering missing item attribute values from unstructured or semi-structured attributes. In some cases, attribute values that are associated with a product in an electronic marketplace may have been left blank or unpopulated. Attribute values may be unintentionally erased by system errors, new attributes may have been added after the item page was created, or the creator of the item page may have left the attributes blank. The disclosed techniques may be utilized to populate some or all of these unpopulated attribute values.

In an electronic marketplace, goods or services typically contain attributes that identify product features. These attributes are often populated by the product's vendor. Having a large number of attributes filled out for each item allows consumers to make better purchasing decisions. When attributes are empty, it may be advantageous to fill them. Some attribute values may sometimes be found within text attached to the item, such as an item description. The systems and methods described herein are directed to extracting those attribute values for population into the attribute. For example, given a situation in which a merchant has created a product page for an lcd tv, but has left the display_size attribute blank, the value for the attribute may exist in text. In this example, if the title of the product is "Samsung LN32D403 32" Class LCD HDTV," then a parser may identify 32" as the display size for the item and populate the display_size attribute with that value.

In an electronic catalog, goods or services may be broken up into product categories. This can be accomplished in a number of ways. For example, some retailers may choose to use a browse-tree, or product hierarchy, to categorize each product. In a browse-tree, each good or service may belong to a category, or browse-node. The browse node may also belong to a parent browse-node. For example, a laptop computer product may belong to a laptops browse-node, which may be a child of the parent node computers, which in turn may be a child of the parent node electronics, etc. Additionally, a product may belong to more than one product category. For example, a digital camera may belong to the product category cameras as well as to the product category electronics.

Additionally, each good or service available (e.g., offered) in an electronic marketplace may be associated with a number of item attributes (references). The attributes may be unique to the category of the good or service, or they may be inherited from a parent category. For example, a member of the laptop category may have a hard_drive_capacity attribute that is inherited from the computer category, as well as a screen_size attribute that is not inherited. In general, attributes can be classified into structured attributes and unstructured/semi-structured attributes. Structured attributes are attributes for which the attribute value has a format, such as those that tend to comprise a number followed by a unit type. For example, the attribute hard_drive_capacity is a structured attribute that has a value that indicates the number of bytes that a hard drive may store, such as 1000 GB or 1 TB. Unstructured attributes are those that have values that do not follow a format. For example, an item_description attribute may be unstructured because it can contain a number of data in any order. For that reason, structured attributes tend to be more organized, accessible, and machine understandable and thus may be used in many applications, such as indexing in facet search, comparison shopping, and/or recommendation.

Furthermore, attributes may be considered either quantitative or non-quantitative. A quantitative attribute is one that can be measured objectively. One example of a quantitative attribute is capacity (e.g., 1 TB, 2 TB, 4 TB) of an external hard drive. A numbered unit is a quantitative reference that is structured as a number followed by a unit type, such as "15 inches" or "eight feet." A non-quantitative structured reference (NQSR) is one that has a structure but is subjective or cannot be measured objectively. Color (red, green, blue), material (gold, silver, brass), and bed size (single, full, queen, king) are good examples of non-quantitative attributes. Additionally, item attributes that indicate compatibility or those that have binary values (yes or no) may also be non-quantitative.

When a structured attribute value is left blank (or is otherwise unpopulated with data), it may be desirable to populate it with information contained in an unstructured attribute. In some embodiments of the disclosure, the process may begin by extracting the possible values of a target attribute from similar products whose target attribute value is not empty. These similar products may be products with the same categorization (such as those sharing a browse-node), or those that are tagged as being similar or comparable products. During the extraction phase, a range of values may be determined by setting the greatest candidate value detected as a maximum value and the least candidate value detected as a minimum value.

Once a list of the possible attribute values for an item is extracted from similar items, the values may be cleaned and/or normalized. This part of the process may be used in order to put each of the possible values into a comparable state. In this part of the process, the attribute values may be converted into alternative unit types. For example, 12 inches, 18", and 2 feet may be converted into 1 foot, 1.5 feet, and 2 feet respectively. Additionally, in some examples "feet" may be converted to "ft," "ft.," or any other measurement designation (e.g., "inches" or "in.") as desired.

In some embodiments of the disclosure, the process may then identify candidate values for the unpopulated attribute from one or more unstructured attributes. In this part of the process, an unstructured attribute may be parsed and tokenized in order to identify possible matches for the attribute value. Each of these candidate attribute values may be converted into a specific unit type. These possible matches may be compiled into a list of candidate values.

In some embodiments of the disclosure, the process may then filter the candidate values to determine the most likely candidate value. For example, the process may remove candidate values from the list of candidate values if they fall outside of a range of values. For the purposes of this application, a range of values may refer to a listing of all available values (i.e. red, maroon, blue, and green), a numerically bounded spectrum (i.e. 1 GB to 5 GB), or the number of occurrences of each available value. A range may or may not include unit types. In some embodiments, the process may choose the most commonly occurring candidate value, the greatest candidate value, or the least candidate value. Once the most likely candidate value is determined, the attribute may be populated with the likely candidate value.

In some embodiments of the disclosure, the candidate values are filtered based on a rule set. The rule set may be predetermined, or it may be generated using a machine-learning algorithm and/or a crowdsourced workforce.

FIG. 1 illustrates an example embodiment of the current disclosure. In FIG. 1, a product 102 is presented. The product 102 may be an item available for sell from an electronic marketplace. The product 102 may be associated with a number of item attributes, which may be unstructured attributes 104 or structured attributes 106. Each of the unstructured attributes 104 and/or structured attributes 106 may have attribute values 108, some or all of which may be unpopulated. One or more of the unstructured attributes 104 may be populated with unformatted text 110.

In some embodiments of the disclosure, some or all of the structured attributes 106 may be unpopulated. Potential values for these structured attributes may be included in the unformatted text 110 that is associated with one or more of the unstructured attributes 104. In some embodiments, the unformatted text 110 is tokenized and parsed in order to identify a potential attribute value. Potential attribute values may then be normalized (put into a standard format or unit type) and filtered down to the most likely attribute value. Once a most likely attribute value is identified, the attribute may be populated with that value.

Figure 2:
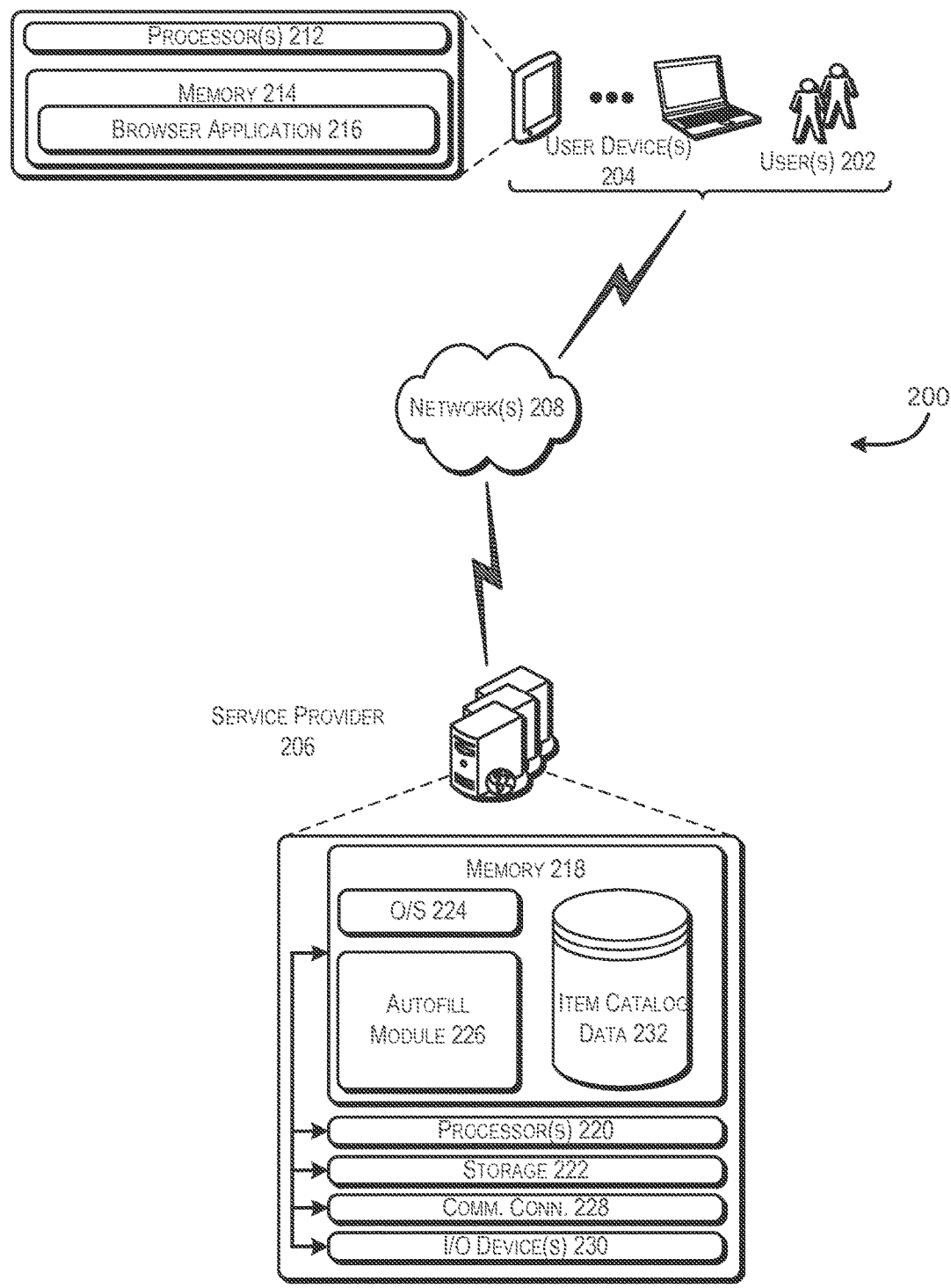
FIG. 2 depicts an illustrative example of a system or architecture in which techniques for automatically populating missing item attributes may be implemented.

FIG. 2 depicts an illustrative example of a system or architecture 200 in which techniques for automatically populating missing item attributes may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 212 capable of processing user 202 input. The user device 204 may also include one or more sensors for receiving user 202 input, such as an accelerometer, camera, infrared sensor, etc. Embodiments of the application on the user device 204 may be stored and executed from its memory 214.

In some examples, the network(s) 208 may include any one or a combination of many different types of networks, such as cable networks, the Internet, wireless networks, cellular networks, and other private and/or public networks. While the illustrated example represents the users 202 accessing the browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data develop and/or deploy computer applications, and/or host web content. The one or more service provider(s) 206, perhaps arranged in a duster of servers or as a server farm, may host the browser application 216. These servers may be configured to host a website (or combination of websites) viewable via the user device 204 or a web browser accessible by a user 202. Other server architectures may also be used to host the browser application 216. The browser application 216 may be capable of handling requests from many users 202 and serving, in response, various user interfaces that can be rendered at the user device 204 such as, but not limited to, a web site. The browser application 216 can be any type of website that supports user interaction, including social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 might be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 218 and one or more processing units (or processor(s)) 220. The processor(s) 220 may be implemented as appropriate in hardware, computer-executable instructions, firmware or combinations thereof. Computer-executable instruction or firmware implementations of the processor(s) 220 may include computer-executable or machine executable instructions written in any suitable programming language to perform the various functions described.

The memory 218 may store program instructions that are loadable and executable on the processor(s) 220, as well as data generated during the execution of these programs. Depending on the configuration and type of service provider 206, the memory 218 may be volatile (such as random access memory (RAM)) and/or non-volatile (such as read-only memory (ROM), flash memory, etc.). The service provider 206 may also include additional storage 222, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM) or ROM. Turning to the contents of the memory 218 in more detail, the memory 218 may include an operating system 224 and one or more application programs or services for implementing the features disclosed herein including at least a module for automatically populating missing item attributes (autofill module 226).

The memory 218 and the additional storage 222, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. As used herein, modules may refer to programming modules executed by computing systems (e.g., processors) that are part of the user device 204 or the service provider 206. The service provider 206 may also contain communications connection(s) 228 that allow the service provider 206 to communicate with a stored database, another computing device or server, user terminals, and/or other devices on the network(s) 208. The service provider 206 may also include input/output (I/O) device(s) and/or ports 230, such as for enabling connection with a keyboard, a mouse, a pen, a voice input device, a touch input device, a display, speakers, a printer, etc.

Figure 3:
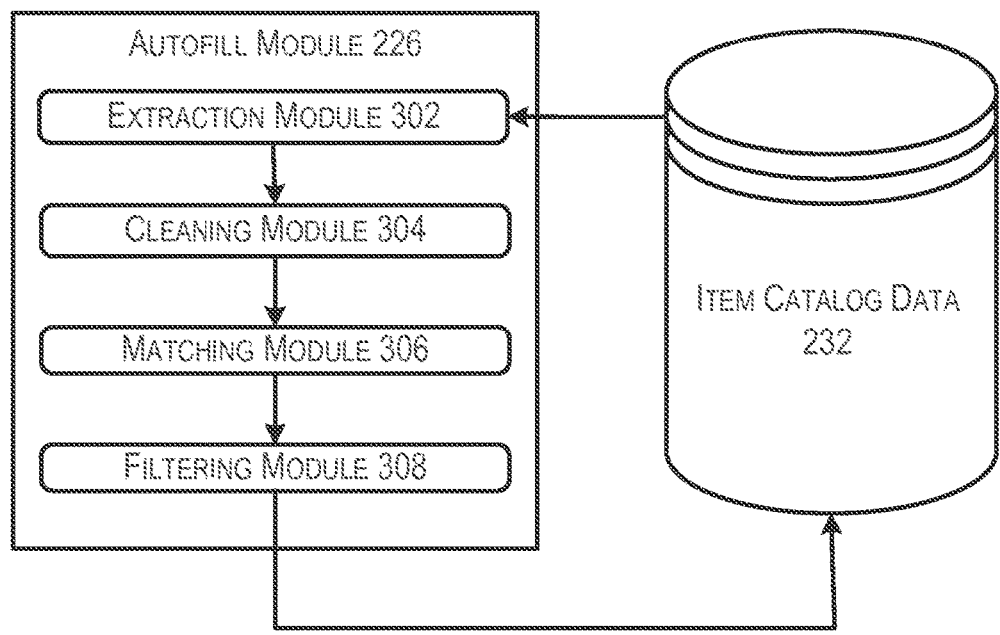
FIG. 3 depicts an illustrative example of the autofill module as depicted in FIG. 2 above.

Turning to the contents of the memory 218 in more detail, the memory 218 may include an operating system 224, a database containing item catalog data 232 and the one or more application programs or services for implementing the features disclosed herein, including an autofill module 226 that is discussed in FIG. 3 in more detail.

FIG. 3 depicts an illustrative example of the autofill module 226 as depicted in FIG. 2 above. As FIG. 3 shows, the autofill module 226 may comprises one or more of the illustrated modules. The autofill module 226 may include an extraction module 302 for extracting attribute data from item catalog data 232. The autofill module 226 may include a cleaning module 304 for normalizing data that is extracted by the extraction module 302. The autofill module 226 may include a matching module 306 for identifying possible attribute values. The autofill module 226 may include a filtering module 308 for reducing possible attribute values to the most likely attribute value.

In some embodiments, the extraction module 302 may be configured to extract attribute values from a number of items in an item catalog 232. When an item attribute is identified for extraction, the extraction module may compile one or more lists of possible values for that attribute. In some embodiments, a separate list may be compiled for each of one or more related product categories. In some embodiments, the extraction module 302 may be configured to group the possible attribute values on the list into synonyms. For example, where an attribute value for color is grey, the extraction module may group the value with gray and silver.

In some embodiments, the extraction module 302 may identify a range of possible attribute values. For example, if the largest value for a laptop's RAM attribute is 3 GB and the smallest value is 1 GB, then the extraction module may determine that likely values for a laptop's RAM attribute should be between 1 and 3 GB. In some embodiments, the extraction module 302 may keep track of the most commonly occurring value for the attribute. In some embodiments, extracted existing values are each assigned a priority.

In some embodiments, the extraction module 302 may also be configured to discover all of the units in the attribute values. Typically, all of the units in an attribute belong to the same unit family. For example, storage may be in gb, tb, or mb and length may be in cm, inches, or feet. From the unit frequencies, the extraction module 302 may be configured to determine the most popular unit in the attribute so that candidate attribute values can be converted to that unit type.

In some embodiments, the cleaning module 304 may be configured to normalize attribute data. In some embodiments, normalization may include converting between unit types, such as from inches to centimeters. In some embodiments, the cleaning module may apply a common format for unit types. For example, six inches, 0.5', and half a foot may all be normalized to 6". In some embodiments, the cleaning module 304 may be configured to convert all possible attribute values to the most popular unit type, as found by the extraction module 302.

In some embodiments, the matching module 306 may be configured to identify one or more tokenized strings that match, or are synonyms of, one or more of the extracted values. Tokenized strings that are identified by the matching module 306 may be compiled into a list of candidate values for the unpopulated attribute.

For some attributes, the matching module 306 may be configured to ignore small variances in unit quantity and treat them as equivalent. For example, both 1000 GB and 1024 GB are often used to describe one Terrabyte (1 TB) and may be considered equivalent. For some attributes, small variances may need to be treated separately. For example, a 12.1 megapixel resolution attribute for a digital camera may be treated as being separate from a 12.3 megapixel resolution attribute.

The filtering module 308 may be configured to determine whether a candidate facet value is the right value. For example, if the autofill module 226 needs to extract color from the following unstructured text: "Black—PropUp iPad Stand—Ergonomic Holder for Apple iPad Versions 1-4, not iPad Air. Pink and Green also available," the matching module 306 should identify three candidate values: "Black," "Pink," and "Green." The filtering module 308 may be configured to determine, based on the context, that "Black" is the correct value, rather than "Pink" or "Green." In some embodiments, the filtering module 308 may be configured to use a rule engine which is described in more detail below.

In some embodiments, the filtering module 308 may be configured to identify, from the list of candidate attribute values, the most likely candidate value. In some embodiments, the most likely candidate value may be the greatest (or largest) candidate value found by the matching module 306. In some embodiments, the most likely candidate value may be the least (or smallest) candidate value found by the matching module 306. In some embodiments, the most likely candidate value may be the candidate value found by the matching module 306 which occurs most often in the list of extracted values. In some embodiments, the filtering module 308 may be configured to remove unlikely values from the list of candidate attribute values until one value remains. The filtering module 308 may do this by applying rules to attribute values. In some embodiments, the filtering module 308 may remove values from the list that are outside of the range determined by the extraction module 302. Once a most likely candidate value is determined, that attribute value may be populated into the unfilled attribute associated with the item. In some embodiments, the most likely candidate value may be determined by the filtering module 308 based on the context in which it appears. In some embodiments, priorities may be assigned to candidate values by either the matching module 306 or the filtering module 308. Priorities may be pre-determined or they may be based on rules. For example, "large" is a substring of "x-large," so "x-large" may be assigned a higher priority than "large." In this example, if both "large" and "x-large" are found in the item data, "x-large" is assigned a higher value, so that it is more likely to be chosen as the appropriate attribute value. As discussed above, priorities may also be assigned to each extracted existing value. In these embodiments, the attribute value may be populated with the candidate value that has the highest priority attached to its corresponding existing value. For example, if the existing values for an attribute include both "red" and "blue," and "red" is assigned a higher priority, then if both "red" and "blue" are found in the item data, "red" will be populated to the attribute value. In some embodiments, if more than one existing values are extracted, all candidate values may be removed from the list of candidate values.

Figure 4:
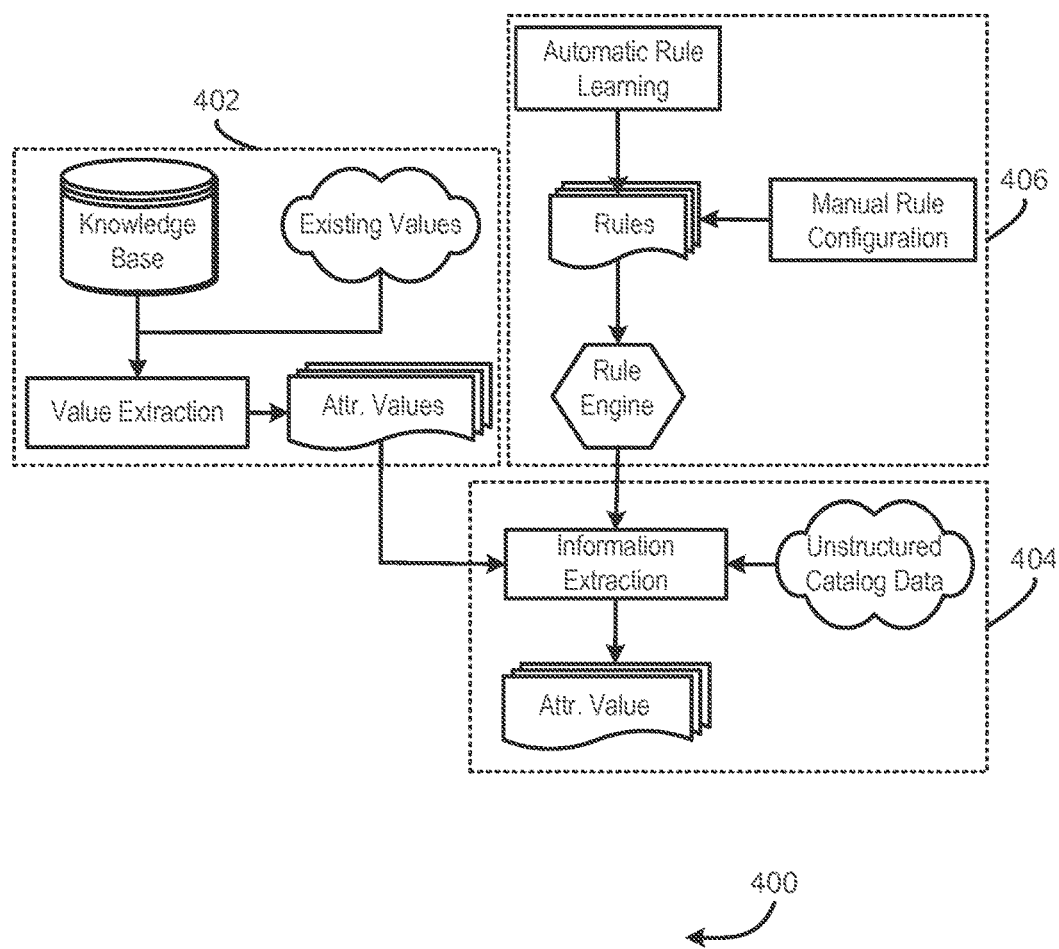
FIG. 4 illustrates an example workflow diagram for a system that automatically fills an attribute based on unstructured text.

FIG. 4 illustrates an example workflow diagram for a system that automatically fills an attribute based on unstructured text. Some or all of the process 400 for any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

During the extraction phase 402 of process 400, a list of existing values for an unpopulated item attribute is compiled from populated values of the attribute for other items. In the extraction phase 402, a knowledge base is mined for existing values for an attribute. The knowledge base may be a database that contains multiple items, such as a catalog database for an electronic marketplace. Existing values for an attribute may be extracted from some or all of the items in the knowledge base. In some embodiments, existing values for an attribute may be extracted only from those items similar to, or in the same category as, the item for which the attribute is being populated. In some embodiments, the extraction phase 402 of process 400 results in the compilation of a list of existing attribute values. In some embodiments, the extraction phase 402 of process 400 may return a range of values, such as a minimum and maximum value for the attribute being extracted.

During the matching phase 404 of process 400, a list of candidate values for the unpopulated attribute is compiled by tokenizing and parsing unstructured catalog data. The unstructured catalog data may be any unformatted attribute associated with the item, such as the title, description or a review of the item. The list of candidate values for the unpopulated attribute is then filtered to one candidate attribute value.

Figure 5:
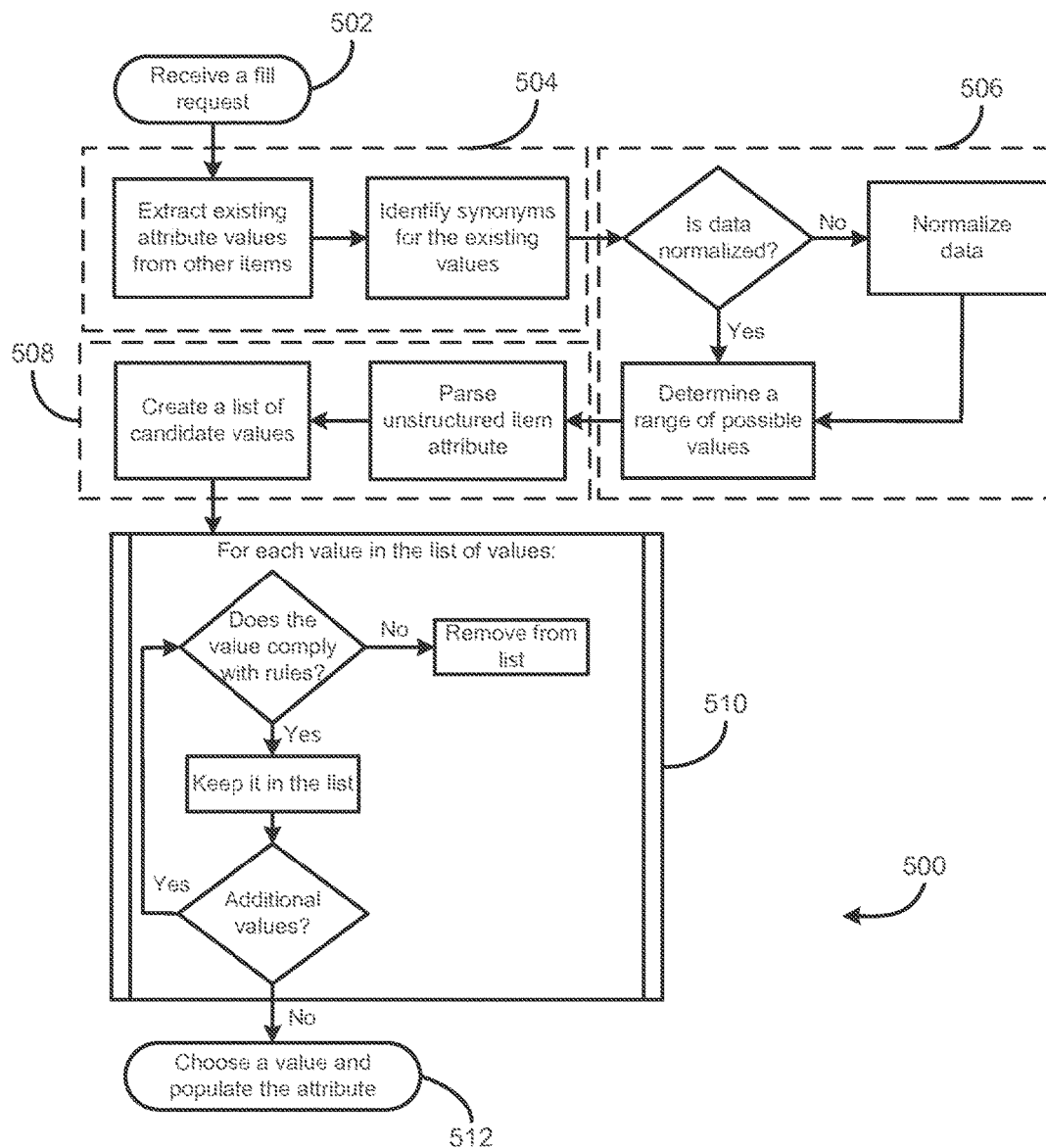
FIG. 5 illustrates an example flow diagram for one embodiment of the current disclosure.

As illustrated in process 400, some embodiments of the current application may implement a rule system 406. The rule system 406 may comprise a set of rules and a rule engine for implementing the rules. In some embodiments, a system administrator or user may manually configure rules in the set of rules. In some embodiments, rules may be set using machine learning algorithms, including algorithms that use workforce auditing (such as crowdsourcing platforms). The rule system 406 is used to filter, or remove, candidate values from the list of candidate attribute values found by the matching phase 404 of the process 400, FIG. 5 illustrates an example flowchart for one embodiment of the current disclosure. Some or all of the process 500 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

In process 500, a request is received at 502 to fill an attribute that is associated with an item and which is currently unpopulated. During the extraction step 504 of process 500, existing values for the attribute are extracted from other items in the dataset for which the attribute is currently populated. In some embodiments, a list of synonyms may be identified and added to these existing values. In some embodiments, synonyms are identified in an electronic library, thesaurus, or dictionary. For example, if the value red is extracted for a color attribute, rose, maroon, blush, crimson, ruby, and burgundy may all be identified as synonyms of the value red.

Some embodiments may also include a cleaning step 506 for process 500. During the cleaning step 506 of process 500, the list of existing values that were extracted in the extraction step 504 are normalized. The process 500 must first determine whether the extracted data is already normalized, or in a standard format. If the extracted data is not in a standard format or if the unit types for the data are varied, then the extracted values may be converted. In this step, values may be converted into a standard unit (e.g. centimeters may be converted to inches) or the unit type may be standardized (e.g. " may be changed to inches). An administrator may set the standard unit type, or it may be determined dynamically. For example, an administrator may determine that an attribute should be displayed in "inches." Alternatively, "inches" may be determined to be the standard unit type because it was the most common unit type for the attribute at the time that the extraction step 504 compiled the data. Once the data has been normalized, a range of possible values may be determined by finding the minimum and maximum existing values for the attribute.

During the matching step 508 of process 500, unstructured attributes for the item are tokenized and parsed. To tokenize the attribute, the text is separated into words and phrases. The data tokens are then compared to the data extracted in the extraction step 504 to find matches. A parser may be configured to identify numbered unit phrases (numbers followed by a unit type) or other format types. In some embodiments, a "match" may be determined based upon the unit type that appears in the tokenized phrase. In some embodiments of the disclosure, the tokens may be normalized before determining whether a match is present. The matching step 508 of process 500 may also take advantage of machine learning algorithms in order to improve match identification. Potential matches that are identified in the matching step 508 may be compiled into a list of candidate attribute values.

During the filtering step 510 of process 500, the list of candidate values compiled by the matching step 508 are filtered. In some embodiments, the filtering step 510 may remove candidate values from the list that are outside of the range of possible values determined in the cleaning step 506. In some embodiments, the list of candidate values is reduced to a smaller set of values or a single value. In some of these embodiments, a rule set may be applied to the list by a rule engine. For each candidate value in the list, the rule engine will determine whether to keep the value or remove it from the list based on the rule set provided. In some embodiments, the rule engine may filter the candidate value list more than once, with the rule set altered after each iteration so that values are removed with each new running. For example, where more than a desired number of candidate attributes remain in a list of candidate values after the rule engine has processed the list, the range may be tightened by choosing a higher minimum value or lower maximum value. Once a single candidate value (or a desired number of candidate values) remains, the process 500 may exit the filtering step 510.

During the populating step 512 of process 500, the unpopulated item attribute may be populated with the chosen attribute value. In some embodiments, the chosen attribute value may be presented to a user for verification prior to populating the attribute. In some embodiments, a value may be selected by a user from a list of candidate values for the attribute prior to populating the attribute.

Figure 6:
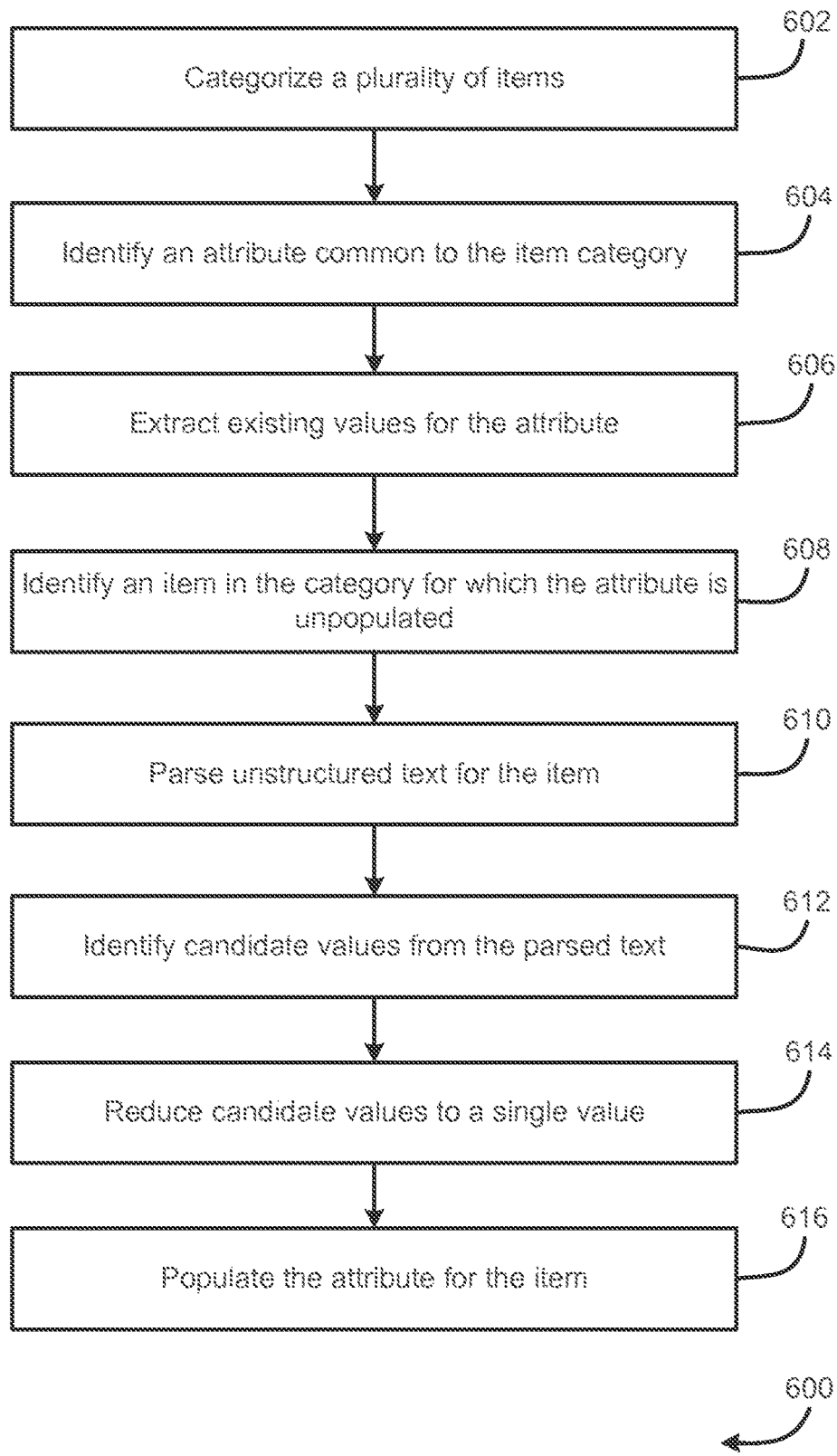
FIG. 6 illustrates an example flowchart for a system that automatically fills an attribute based on unstructured text.

FIG. 6 illustrates an example block diagram for a system that automatically fills an attribute based on unstructured text. Some or all of the process 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At 602 in process 600, a plurality of items is categorized. The plurality of items may be references to physical items that are stored in an electronic marketplace, they may be digital items, such as articles or news stories, or they may be another type of item that has attributes associated with it. When items are categorized, they may be grouped by type, by commonly contained attributes, similar item names, or any number of common traits. Item categorizations may be stored in a separate database from the plurality of items. Each item may belong to one or more categories. For example, a digital camera may belong to the categories of digital cameras, cameras, and electronics.

At 604 in process 600, at least one attribute is identified that is common to one or more category of items. To be common to a category, the attribute may not need to be associated with every item in the category. For example, digital cameras may or may not have a digital zoom and/or an optical zoom. Some items in the category digital camera may have the digital zoom attribute, some may have the optical zoom attribute, some may have both attributes, and some may have neither attribute. In this case, both the digital zoom attribute and the optical zoom attribute may be considered attributes common to the digital camera item category. Where an item belongs to multiple categories, it may have attributes common to each category.

At 606 in process 600, the existing values for the attribute are extracted from each item in the category of items that has a populated value. The process 600 may also keep track of the number of occurrences for each existing value. In some embodiments, a range of values may be determined at step 606. The range of values may be determined by finding a minimum value in the existing attributes and a maximum value in the existing attributes.

At 608 in process 600, an item belonging to the category is identified as having the attribute unpopulated. Items may be identified where the attribute is null, blank, or has a junk value. Items may be identified where the attribute is not associated with the item at all.

At 610 in process 600, unstructured text that is associated with the item is parsed. In some embodiments, the unstructured text may be tokenized before being parsed. In some embodiments, the parser may be configured to identify structured phrases such as numbered unit phrases. In some embodiments, the parser may be configured to identify keywords such as "up to" or "of storage." In some embodiments, the parser may identify unit types.

At 612 in process 600, the parser may identify candidate values for the unpopulated attribute. Candidate values may be identified because they match one or more of the extracted existing values, they share a unit type for one or more of the extracted existing values, or they are used in a context similar as one or more of the extracted existing values. Candidate values may be identified as following or proceeding key words or phrases.

At 614 in process 600, the list of candidate values may be reduced to a desired number of values. In some embodiments, the list of candidate values may be reduced to a single value. Candidate values may be removed from the list by a rule engine referring to a rule set. Candidate values may also be chosen as maximum or minimum values. For example, in the text: "compatible with 16 GB, 32 GB, and 64 GB SD cards," the process 600 may choose "64 GB" as the appropriate value for the available external memory attribute. Candidate values may also be removed from the list of candidate values if they fall outside of the extracted range of values. In some embodiments, candidate values may be filtered based on context. For example, in the text: "Black— Prop Up iPad Stand—Ergonomic Holder for Apple iPad Versions 1-4, not iPad Air. Pink and Green also available," Black, Pink, and Green are all candidate values. However, both Pink and Green appear in conjunction with "also available," which is likely to indicate that they are not correct values. In this example, both Pink and Green would be filtered out, leaving Black as the remaining candidate value. In some embodiments, once the list of candidate values has been reduced to a desired number of attributes, the process 600 may request input from a user. At 616 in process 600, the unfilled attribute may be populated with the remaining candidate value.

Figure 7:
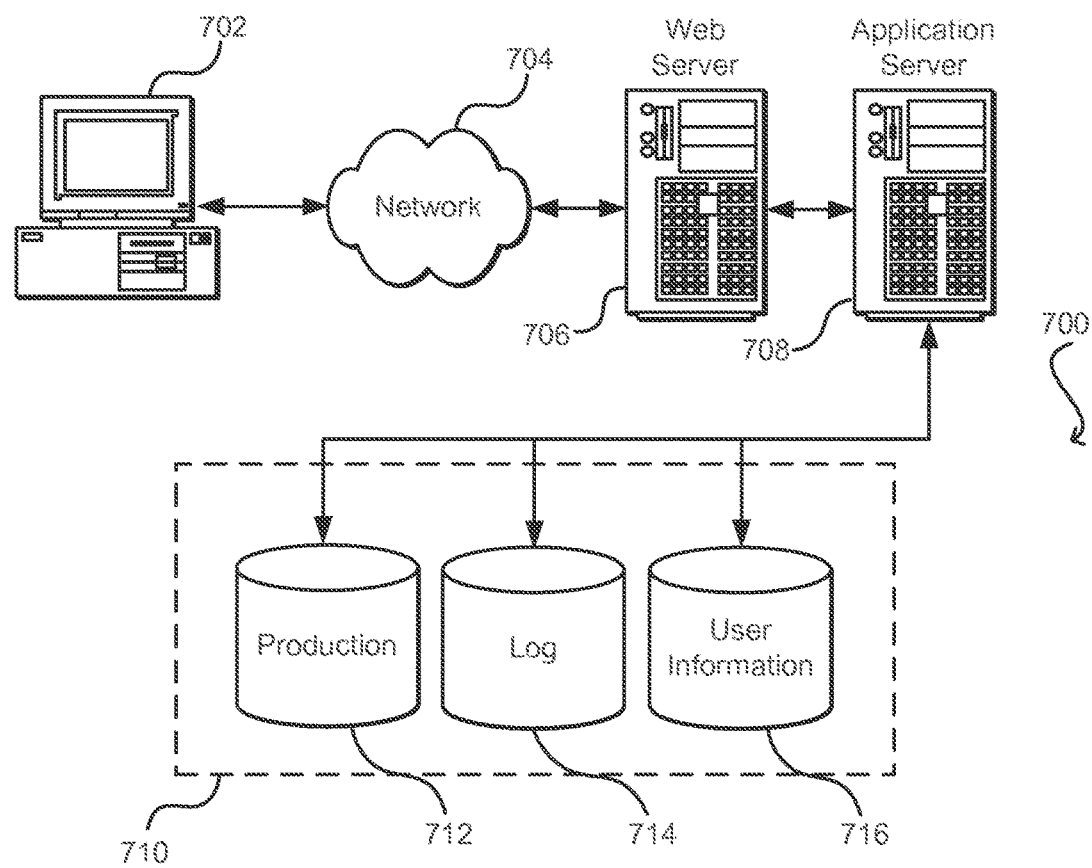
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need, to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

In the preceding description, various embodiments have been described. For purposes of explanation, specific configurations and details are set forth in order to provide a thorough understanding of the embodiments. However, it will also be apparent to one skilled in the art that the embodiments may be practiced without the specific details mentioned. Furthermore, well-known features may have been omitted or simplified in order not to obscure the embodiment being described.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   identifying, for a first item of a plurality of items, at least one item category associated with the first item and at least one second item;
   determining, by a computer system, a plurality of attributes common to the identified at least one item category based at least in part on identifying the plurality of attributes inherited from at least one parent item category associated with the first item, the at least one parent item category being a parent node to a child node associated with the at least one item category associated with the first item and the at least one second item in a browse-node hierarchy;
   identifying at least one attribute of the plurality of attributes that is not populated for the first item;
   extracting, from the at least one second item of the plurality of items, a plurality of existing values assigned to the at least one attribute of the plurality of attributes;
   identifying, from text of the first item, a plurality of candidate values, the plurality of candidate values comprising at least one candidate value for the at least one attribute of the plurality of attributes;
   associating a set of priority indicators with the plurality of candidate values, the set of priority indicators generated based at least in part on pre-determined rules that utilize a context associated with a candidate value of the plurality of candidate values to represent importance of the candidate value in comparison to other potential candidate values, the context based at least in part on a set of candidate values of the plurality of candidate values identified by the pre-determined rules that are associated with a position of a given candidate value within the text;
   implementing a rule engine that implements a rule set specified by a user to iteratively alter the rule set after removing one or more candidate values of the plurality of candidate values to prioritize remaining candidate values of the plurality of candidate values based at least in part on the set of priority indicators;
   filtering the prioritized remaining candidate values from the rule engine to determine a potential value based at least in part on the plurality of existing values associated with the at least one attribute of the plurality of attributes and the prioritized remaining candidate values; and
   populating, by the computing system, the at least one attribute of the plurality of attributes of the first item with the potential value.

2. The computer-implemented method of claim 1, wherein the plurality of attributes common to the identified category is determined by extracting attributes from multiple second items of the plurality of items, each of the multiple second items associated with the identified category.

3. The computer-implemented method of claim 1, wherein the text of the first item is unstructured.

4. The computer-implemented method of claim 1, further comprising determining a unit type that is associated with the at least one attribute of the plurality of attributes.

5. The computer-implemented method of claim 1, further comprising normalizing the at least one candidate value.

6. The computer-implemented method of claim 1, further comprising determining a range of existing values, the range of existing values being determined by identifying a minimum value and a maximum value in the plurality of existing values assigned to the at least one attribute of the plurality of attributes.

7. The computer-implemented method of claim 6, wherein at least one candidate value is removed from the plurality of candidate values, based at least in part on the candidate value being outside of the range of existing values.

8. A non-transitory computer-readable storage medium storing computer-executable instructions that, when executed by a processor, configure the processor to perform operations comprising:
   identifying at least one first item of a plurality of items for which an attribute is unpopulated based at least in part on identifying a plurality of attributes inherited from at least one parent item category associated with the at least one first item and at least one second item, the at least one parent item category being a parent node to a child node associated with at least one first item and the at least one second item in a browse-node hierarchy;
   extracting a plurality of existing values for the attribute based at least in part on the at least one second item of the plurality of items, the at least one second item having the attribute populated;
   associating a set of priority indicators with the plurality of existing values, the set of priority indicators generated based at least in part on pre-determined rules that utilize a context associated with an existing value of the plurality of existing values to represent importance of the existing value in comparison to other existing values, the context based at least in part on a set of existing values of the plurality of existing values identified by the pre-determined rules that are associated with a position of a given existing value within text of the at least one first item;
   implementing a rule engine that implements a rule set specified by a user to iteratively alter the rule set after removing one or more existing values of the plurality of existing values to prioritize remaining existing values of the plurality of existing values based at least in part on the set of priority indicators;

determining a potential value for the attribute from the text associated with the at least one first item based at least in part on filtering the plurality of existing values and the prioritized remaining existing values from the rule engine; and populating the attribute of the at least one first item of the plurality of items with the determined potential value.

9. The non-transitory computer readable storage medium of claim 8, wherein the at least one first item is related to the at least one second item.

10. The non-transitory computer readable storage medium of claim 8, wherein the text associated with the at least one first item is one of a title, comments or user review for the first item.

11. The non-transitory computer readable storage medium of claim 8, wherein the potential value is determined to be a phrase from the text associated with the at least one first item that most commonly occurs in the plurality of existing values.

12. The non-transitory computer readable storage medium of claim 8, wherein the potential value is determined by applying a rule from the rule set.

13. The non-transitory computer readable storage medium of claim 12, wherein the rule set is built using at least one machine learning algorithm.

14. The non-transitory computer readable storage medium of claim 12, wherein the rule set is associated with an item category type to which the at least one first item belongs.

15. A system, comprising:
a processor; and
a memory device including instructions that, when executed by the processor, cause the system to:
provide a first item categorization for a set of items;
determine at least one attribute associated with the first item categorization;
identify at least one first item of the set of items for which the associated at least one attribute is empty based at least in part on identifying a plurality of attributes inherited from a parent item category associated with the at least one first item and at least one second item, the parent item category being a parent node to a child node associated with the at least one first item and the at least one second item in a browse-node hierarchy;

determine, from one or more second items of the set of items, a range of existing values for the attribute;

associate a set of priority indicators with the range of existing values, the set of priority indicators generated based at least in part on pre-determined rules that utilize a context associated with an existing value of the range of existing values to represent importance of the existing value in comparison to other existing values, the context based at least in part on a set of existing values of the plurality of existing values identified by the pre-determined rules that are associated with a position of a given existing value within text of the at least one first item;

implement a rule engine that implements a rule set specified by a user to iteratively alter the rule set after removing one or more values from the range of existing values to prioritize remaining values of the range of existing values based at least in part on the set of priority indicators;

filter the prioritized remaining values from the rule engine to determine at least one potential value for the attribute based at least in part on the range of existing values and the prioritized remaining values;

determine, from the at least one potential value for the attribute, a probable value; and set the at least one attribute associated with the first item to the probable value.

16. The system of claim 15, wherein the probable value is the maximum of the at least one potential value for the attribute or the minimum of the at least one potential value for the attribute.

17. The system of claim 15, wherein the probable value is determined based at least in part on the context of the probable value in the data associated with the first item.

18. The system of claim 15, wherein the at least one first item belongs to a second item categorization.

* * * * *